US012224975B2

United States Patent
Bower, III et al.

(10) Patent No.: US 12,224,975 B2
(45) Date of Patent: Feb. 11, 2025

(54) AUTOMATIC CONFIGURATION OF NETWORK ADDRESS TRANSLATION FOR DEVICES HAVING AN INCOMPATIBLE NETWORK ADDRESS

(71) Applicant: Lenovo Enterprise Solutions (Singapore) Pte Ltd., Singapore (SG)

(72) Inventors: Fred Allison Bower, III, Durham, NC (US); Jarrod B Johnson, Raleigh, NC (US); Shyam Sareen, Cary, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 0 days.

(21) Appl. No.: 18/193,857

(22) Filed: Mar. 31, 2023

(65) Prior Publication Data

US 2024/0333676 A1 Oct. 3, 2024

(51) Int. Cl.
*H04L 61/256* (2022.01)
*H04L 45/74* (2022.01)
*H04L 61/255* (2022.01)

(52) U.S. Cl.
CPC .......... *H04L 61/256* (2013.01); *H04L 45/74* (2013.01); *H04L 61/255* (2013.01)

(58) Field of Classification Search
CPC ...... H04L 61/256; H04L 45/74; H04L 61/255
See application file for complete search history.

(56) References Cited

U.S. PATENT DOCUMENTS

2003/0086422 A1 * 5/2003 Klinker .................. H04L 45/38
370/235
2011/0305160 A1 * 12/2011 Green .................. H04L 43/026
370/252

* cited by examiner

Primary Examiner — David R Lazaro
Assistant Examiner — Zia Khurshid
(74) Attorney, Agent, or Firm — Jeffrey L. Streets

(57) ABSTRACT

A computer program product includes program instructions configured to be executable by a processor of a networking hardware device to cause the processor to perform various operations. The operations include monitoring network communications on a first port of the networking hardware device to identify a first network address of a first device attached to the first local port and determining that the first network address is incompatible with communication on an external network. The operations further include automatically configuring, in response to determining that the first network address is incompatible with communication on an external network, independent network address translation for the first local port to translate the incompatible first network address to a compatible network address for all egress traffic from the first device and to translate the compatible network address to the incompatible first network address for all ingress traffic to the first device.

21 Claims, 5 Drawing Sheets

AUTOMATIC CONFIGURATION OF NETWORK ADDRESS TRANSLATION FOR DEVICES HAVING AN INCOMPATIBLE NETWORK ADDRESS

BACKGROUND

The present disclosure relates to the operation of network hardware devices to resolve incompatible IPv4 addresses of attached devices.

BACKGROUND OF THE RELATED ART

In many instances, devices connecting to Ethernet switch infrastructure come with a static default configuration. For example, most devices that communicate on a Transport Control Protocol/Internet Protocol (TCP/IP) network will be provided with a pre-programmed default Internet Protocol version 4 (IPv4) configuration. Such devices may include servers, storage devices, network switches and routers, intelligent power distribution units (PDUs), and other data center infrastructure. A static default IPv4 configuration may include a default IPv4 address and some additional IPv4 configuration settings, such as a subnet mask.

There are also instances where a dynamic IPv4 configuration will fall back to a static default IPv4 configuration if a dynamic query fails to receive a response in a given amount of time. For example, a device may send a Dynamic Host Configuration Protocol (DHCP) request for a new IP address or to renew an existing IP address, but the device may return to a static default configuration if a timeout period has expired prior to receiving a DHCP Acknowledgement. These and other situations can lead to a conflict of IPV4 addresses on a switch subnet since many devices may use the same default address in this configuration.

Duplicate address conflicts are typically resolved by disabling the offending network interfaces. For example, if two devices are found to have the same (default) network addresses, the network interfaces of the two devices may be disabled either by a switch that is connected to the two devices or by software controlling one of the offending devices, such as an Ethernet device driver or firmware. The disabled network interface(s) require manual administrative intervention to resolve, such as manually assigning a unique IP address to each device.

IPv4 Link-Local Addresses are unsuitable to resolve the duplicate addresses because IPv4 Link-Local addresses are confined to a small range with no guarantee of uniqueness and therefore often conflict with each other. However, Internet Protocol version 6 (IPv6) Link-Local Addresses (LLA) can be used to resolve the conflict caused by devices with duplicate addresses since an IPV6 LLA is guaranteed unique by the specification of its construction, which includes a set of bytes that are encoded by a guaranteed unique identifier burned into every IPv6 port. Accordingly, if communication between devices is disabled due to conflicting IPv4 addresses, the device configuration may still be accessed using the IPV6 LLA address of the device. Unfortunately, IPv6 may not be enabled/supported on all devices that are coupled to the switch.

BRIEF SUMMARY

Some embodiments provide a computer program product comprising a non-volatile computer readable medium and non-transitory program instructions embodied therein, the program instructions being configured to be executable by a processor of a networking hardware device to cause the processor to perform various operations. The operations comprise monitoring network communications on a first port of the networking hardware device to identify a first network address of a first device attached to the first local port and determining that the first network address is incompatible with communication on an external network. The operations further comprise automatically configuring, in response to determining that the first network address is incompatible with communication on an external network, independent network address translation for the first local port to translate the incompatible first network address to a compatible network address for all egress traffic from the first device and to translate the compatible network address to the incompatible first network address for all ingress traffic to the first device.

Some embodiments provide a method comprising monitoring network communications on a first port of the networking hardware device to identify a first network address of a first device attached to the first local port and determining that the first network address is incompatible with communication on an external network. The method further comprises automatically configuring, in response to determining that the first network address is incompatible with communication on an external network, independent network address translation for the first local port to translate the incompatible first network address to a compatible network address for all egress traffic from the first device and to translate the compatible network address to the incompatible first network address for all ingress traffic to the first device.

DETAILED DESCRIPTION

Figure 1:
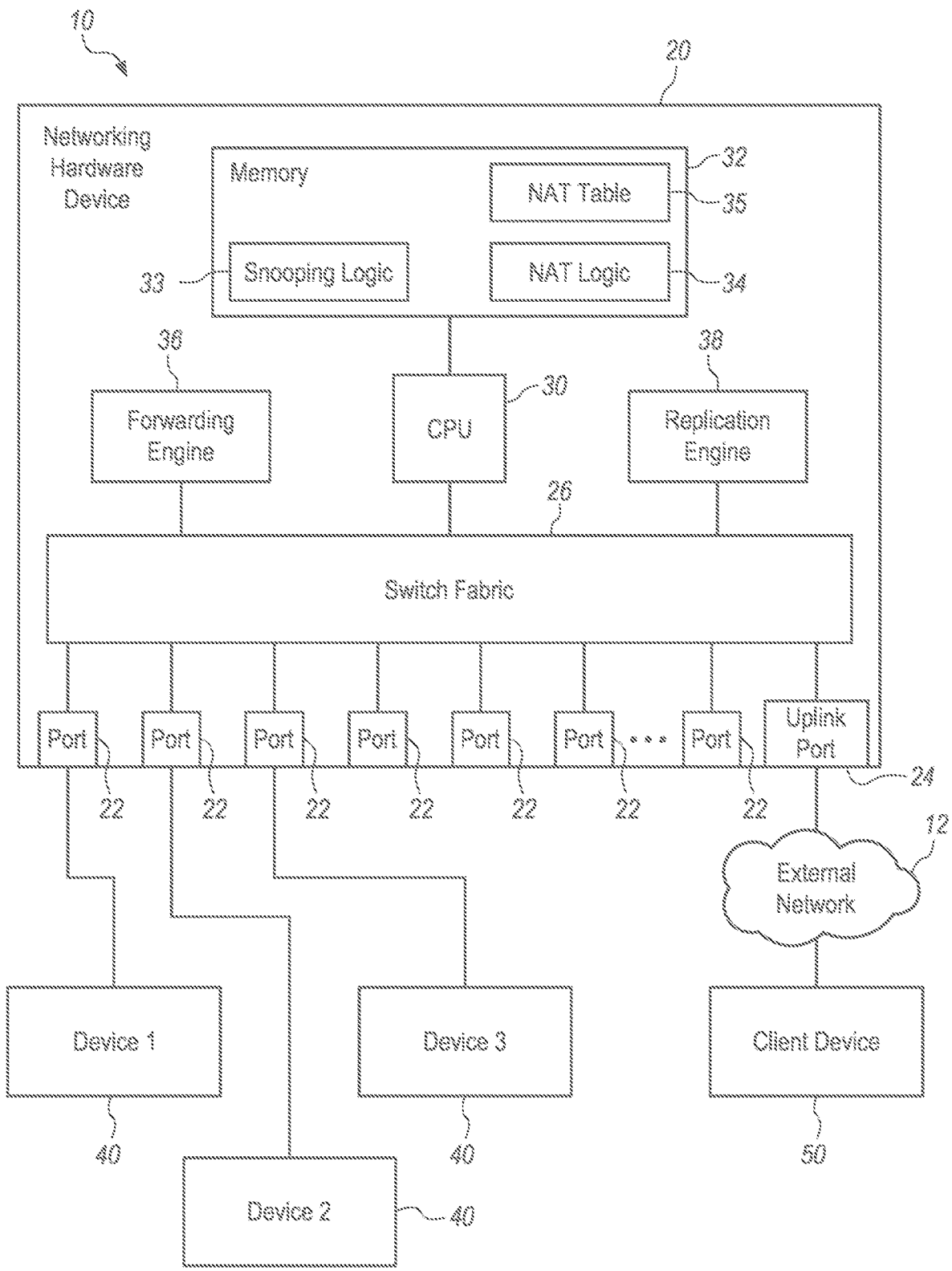
FIG. 1 is a diagram of a system including a networking hardware device with computing devices attached to multiple local ports and an uplink port providing access to a client device on an external network.

Some embodiments provide a computer program product comprising a non-volatile computer readable medium and non-transitory program instructions embodied therein, the program instructions being configured to be executable by a processor of a networking hardware device to cause the processor to perform various operations. The operations comprise monitoring network communications on a first port of the networking hardware device to identify a first network address of a first device attached to the first local port and determining that the first network address is incompatible with communication on an external network. The operations further comprise automatically configuring, in response to determining that the first network address is incompatible with communication on an external network, independent network address translation for the first local port to translate the incompatible first network address to a compatible network address for all egress traffic from the first device and to translate the compatible network address to the incompatible first network address for all ingress traffic to the first device.

A "networking hardware device" or simply "networking hardware" refers to electronic devices that are required for communication and interaction between nodes in a computer network. The networking hardware device supports and mediates data transmission in the computer network. Non-limiting examples of a networking hardware device include a switch, router and gateway. The networking hardware device may include one or more processor or processing unit, such as a central processing unit (CPU), that executes program instructions of a software application or module to implement one or more embodiment described herein. For example, a processor that is included in the networking hardware device may perform network address translation (NAT) operations for any one or more port as described herein. The networking hardware device may include multiple local (physical) network ports that are available for attaching a computing device. Without limitation, the computing device may be attached to the network port using a cable, such as an Ethernet cable. Accordingly, the computing device may send and receive network packets through the network port to which the computing device is attached. The networking hardware device may also include at least one uplink port for connecting the networking hardware device to an external network, such as another local area network or a wide area network including the Internet.

Each computing device has a network address, such as an Internet Protocol (IP) address. The Internet Protocol is the network layer communications protocol in the Internet protocol suite that is responsible for relaying datagrams across network boundaries. Specifically, the Internet Protocol performs the task of delivering network packets from a source device to a destination device based on the IP addresses that are identified in a packet header portion of each network packet. An IP address is a numerical label that may be represented as text using a standard dotted-decimal form, such as a standard IP version 4 (IPv4) form "ddd.ddd.ddd.ddd" where "ddd" is a one-to-three digit decimal number between 0 and 255, or a standard IP version 6 (IPv6) form "x:x:x:x: x:x:x:x where "x" is the hexadecimal value of the eight 16-bit pieces of the address.

Network communications on the first port of the networking hardware device are monitored to identify the first network address of the first device attached to the first local port. Having identified the first network address, the networking hardware device may detect or determine whether or not the first network address is incompatible with communication on an external network. A network address of a device may be incompatible with communication on an external network for various reasons. As one example, a device's network address may be incompatible because the network address may be within a range of IP address that are reserved for private networks, such as 10.0.0.0/8 (range 10.0.0.0 to 10.255.255.255), 172.16.0.0/12 (range 172.16.0.0 to 172.31.255.255) and 192.168.0.0/16 (range 192.168.0.0 to 192.168.255.255). As another example, a device's network address may be incompatible because the network address is the same as (or a duplicate of) the network address of another device on the same local network.

Network address translation (NAT) is a process in which a local IP address is translated into a different IP address and vice versa in order to provide a local device with access to an external network, such as the Internet. More specifically, NAT is a method of modifying network address information in the IP header of network packets while they are passing through the network hardware device. For example, the NAT may be one of various types of NAT, such as basic NAT. Basic NAT provides a one-to-one translation of IP addresses, such that only the IP addresses, IP header checksum, and any higher-level checksums that include the IP address are changed. Embodiments may perform the NAT operation "per-port", so that the NAT operation is private to the downstream (local) device. Accordingly, it is possible for two or more attached devices to utilize the same port-side network address since there is no interference between the ports. The NAT operation may be considered to be a logical NAT-per-port because the NAT operations may be performed by a single software component or instance. However, the physical isolation of the port to the downstream (local) device is preserved on the downstream side of the NAT. In a further option, the network address translation for each port may be performed at each individual port supported by hardware, firmware and/or software, such as an application specific integrated circuit (ASIC), field-programmable gate array (FPGA), or processor.

In some embodiments, the computer program product may be a software program that forms one or more module, plugin or update to the switch operating system and/or a stand-alone application.

In some embodiments, the operations performed by the network hardware device may further comprise receiving an egress network packet from the first device, wherein the egress network packet includes the incompatible first network address as a source address. The networking hardware device may then translate the source address of the received egress network packet from the incompatible first network address to the compatible network address and forward the egress network packet with the compatible network address for routing to a destination address contained within the egress network packet. The network address translation and packet forwarding functionality may be performed by the network hardware device in a transparent manner, such that the other devices on the external network are unaware that the device has a local network address that is incompatible with communication on the external network. All traffic coming from the local device is detected at the switch port and the NAT translates the device address in all network packets before forwarding that traffic to its destination. In other words, the incompatible network address of the first device is only used to identify the first device in network communications on the link between the first device and the first network port, and the compatible network address is used to identify the first device in network communications between the first network port and another device having the destination address. It should be appreciated that the first device may have a network address, such as an IP address, that is incompatible with communication over the external network, yet the network address translation may be performed to enable the first device to send network packets to another device on the external network without changing the network address of the first device.

In some embodiments, the operations performed by the network hardware device may further comprise receiving an ingress network packet directed to the first device, wherein the ingress network packet includes the compatible network address as a destination address. The compatible network address in the ingress network packet may be the same compatible network address that the networking hardware device has used, or may eventually use, to translate egress network packets from the first device. The operations may further include translating the destination address of the received ingress network packet from the compatible network address to the incompatible first network address of the first device and forwarding the ingress network packet with the incompatible first network address from the first port to the first device. It should be appreciated that the first device may have a network address, such as an IP address, that is incompatible with communication over the external network, yet the network address translation may be performed to enable the first device to receive network packets from another device on the external network without changing the network address of the first device.

In some embodiments, the operations performed by the network hardware device may further comprise selecting a network address that is routable on the external network and is not in use by any other device attached to the networking hardware device to be the compatible network address. In further operations, the selected compatible network address may be assigned to be used for translating the source address of an egress network packet received on the first port from the first device and a first record may be stored in a network address translation table, wherein the first record includes an identifier for the first port, the incompatible first network address of the first device, and the assigned compatible network address. The network address translation table may include a plurality of such records including a port identifier for a network port of the networking hardware device, a network address of a local device attached to the network port that has been found to be incompatible with communication on the external network, and a compatible network address that should replace the incompatible network address in all network packets directed from the local device to a destination on the external network. Optionally, one or more new records may be added to the network address translation table in response to identifying another device attached to the network hardware device that has an incompatible network address. The networking hardware device may monitor traffic on each network port and perform a translation on any network packet for which there is a corresponding record in the network address table.

In some embodiments, the operations performed by the network hardware device may further comprise receiving an egress network packet from the first device on the first port, wherein the egress network packet includes the incompatible first network address as the source address. The operations may further comprise using the identifier for the first port or the incompatible first network address in the egress network packet to identify the first record in the network address translation table and then translating, using the identified first record in the network address translation table, the source address of the received egress network packet from the incompatible first network address to the compatible network address stored in the identified first record. After translating the source address, the egress network packet with the compatible network address may be forwarded for routing to a destination address contained within the egress network packet.

In some embodiments, the operations performed by the network hardware device may further comprise receiving an ingress network packet directed to the first device, wherein the ingress network packet includes the compatible network address as a destination address. The operations may further comprise using the identifier for the first port or the compatible network address in the ingress network packet to identify the first record in the network address translation table, translating the destination address of the received ingress network packet from the compatible network address to the incompatible first network address stored in the identified first record, and forwarding the ingress network packet with the incompatible first network address from the first port to the first device. The network address translation table may be used for both egress and ingress traffic (network packets), but egress network packets are translated so that the source address is changed from the incompatible network address of the attached device to the compatible network address assigned to represent the device for communication on the external network and ingress network packets are translated so that the destination address is changed from the compatible network address that represents the attached device on the external network to the incompatible network address of the attached device.

In some embodiments, the operations performed by the network hardware device may further comprise monitoring network communications on a second port of the networking hardware device to identify a second network address of a second device attached to the second port, wherein the first network address is incompatible with communication on the external network due to the second network address being a duplicate of the first network address. Optionally, the network hardware device may monitor many or all of its local (downstream) network ports to identify the network address of each device attached to those network ports. The central processing unit of the networking hardware device may monitor network traffic on each port since all ingress and egress network traffic on each port flows through, or is processed by, the switch central processing unit.

For example, the operations may identify an IPV4 address for each attached device. A duplicate network address may be identified between any two or more of the attached devices and may cause automatic configuration of network address translation for one or more of the network ports to which those devices are attached. In fact, embodiments may identify any number of attached devices having incompatible network addresses and configure network address translation for any or all of those identified devices. For example, any number of the attached devices may default to the same default IPV4 address such that each of those devices may use the same conflicting network address.

In some embodiments, the operations performed by the network hardware device may further comprise automatically configuring, in response to determining that the second network address is a duplicate of the first network address, independent network address translation for the second port to translate the second network address to a second compatible network address for all egress traffic from the second device and to translate the second compatible network address to the second network address for all ingress traffic to the second device. Accordingly, this embodiment may perform network address translation for each of the devices that have duplicate network addresses. However, alternative embodiments may perform network address translation for all but one of the devices that duplicate network addresses. By performing NAT for all but one of the devices (i.e., n−1, where n is the number of devices having a conflicting/duplicate network address), the last device may retain its network address without any conflict.

In some embodiments, the operations performed by the network hardware device may further comprise generating a notification identifying that the first device attached to the first port has an incompatible first network address. A notification may be beneficial to inform administrative personnel about the existence of the incompatible network address and the need to take action, at their discretion, to resolve the incompatible network address. Embodiments may take automatic action to configure NAT so that attached devices are able to communicate on the external network without any apparent interruption, but there may still be some value or benefit to directly eliminate the incompatible network address so that the NAT is not necessary over an extended period of time. Without a notification, the administrator may not be aware of the incompatible address or that one or more of the embodiments has taken action to enable an attached device to communicate on the external network.

In some embodiments, the operations performed by the network hardware device may further comprise configuring the first and second port to run in mirror mode to enable monitoring of local traffic between devices attached to local network ports of the networking device. Optionally, each downstream port of the network hardware device may run in mirror mode to monitor all traffic through the downstream ports.

In some embodiments, the operations performed by the network hardware device may further comprise determining that a second device attached to a second port is being, or has been, replaced with a third device attached to the second port, wherein the second device has a second network address and the third device has a third network address. The operations may further comprise configuring, in response to detecting the replacement of the second device with the third device on the second port, independent network address translation for the second port to translate the third network address to the second network address for all egress traffic from the third device and to translate the second network address to the third network address for all ingress traffic to the third device. These operations can provide device identity persistence for service replacements. Accordingly, a technical benefit is provided in that an existing device may be replaced with a new device having a different network address, yet other devices in the local network and/or the external network may communicate with the new device using the same network address that was used to communicate with the existing device.

In some embodiments, the attached devices may view the NAT logic of the switch as a gateway. For example, the NAT logic may be associated with an IP address (gateway IP address) that the NAT uses to receive traffic for forwarding. The address configuration of the attached device will show that its default gateway is the NAT address associated with the switch port to which the device is attached. Accordingly, there may be a separate NAT address for use with each switch port of the networking hardware device.

Embodiments may make further use of the per-port network address translation (NAT) in the networking hardware device to provide one or more additional service. Optionally, the additional services may be designated by a network administrator. A non-limiting list of such additional services may include: (1) a service using NAT to provide an attached device with access to the network for the purpose of device discovery, registration, configuration, and onboarding into a cluster; (2) a service using NAT to provide temporary interoperability while an attached device is waiting for a Dynamic Host Configuration Protocol (DHCP) service outage to be resolved; (3) a service using NAT to provide dynamic avoidance of network address collisions (duplication); and/or (4) a service to provide device identity persistence in conjunction with a device replacement. Although the NAT parameters may be configured in the same manner regardless of the particular service being implemented, the service being implemented may cause the NAT functionality to be activated at a different point in time or in response to a different set of conditions. In one option, some embodiments may always be active on the switch ports. In a second option, some embodiments may be enabled by policy whether or not an actual conflict of addresses is detected. The policy may be arbitrarily established by a network administrator (personnel) based upon desired functionality or interoperability. For example, if the network administrator has knowledge that there are devices with static IPv4 configurations attached to the networking hardware, then the network administration may directly manage the static IPv4 configurations of those devices rather than utilize the present embodiments of NAT translations for those ports. In another example, a set of priorities may be established to indicate that the device attached to a specified port may retain its IPv4 address in the event the IPV4 address is found to be in conflict with (i.e., is a duplicate of) an IPv4 address of another device attached to another port. In a third option, some embodiments may be enabled in response to an event raised by the networking hardware device where an attached device is detected as being in a device state that requires one or more of the above remediations. Non-limiting examples of such a device state may include: (1) an IP configuration that is a duplicate of an IP configuration of another device attached to the same networking hardware device; (2) an IP configuration that is incompatible with communication on the external network (i.e., a factory-default static configuration that is on an unrouteable subnet, such as 192.168.0.x or 10.10.10.x); or (3) a device replacement where the IP address of the new device is different from the IP address of the previous device, but retention of the previous identity (IP address) is desired for interoperability in the data center. As used herein, a duplicate IP address is a conflict that is a special case of the more general conflict referred to as an "incompatible configuration."

The NAT logic implemented by the networking hardware device may be configured to utilize a first IPv4 address on the link between a downstream network port and the device attached to the downstream network port, and to use a second IPv4 address on the local and/or external network. An IPV4 address of a device is "compatible" if it has a routable subnet configuration and is not in conflict with other IPv4 addresses within the subnet. A subnet is a logical subdivision of an IP network into two or more networks. Typically, addresses within the same subnet having an identical most-significant bit-group in the IP addresses. A new IPv4 address for the network traffic to and from a given device may be selected in any manner, such as a predetermined ruleset established by a network administrator or a heuristic that utilizes observation of traffic (snooping on the uplink port) to track the network addresses that are in use on a given subnet and on the external network beyond the networking hardware device. Accordingly, the NAT logic may select a network address to utilize for NAT that is unlikely to cause problems on the network. In one example, the NAT logic may increment the least significant digit of the IPV4 address until reaching an unused IPv4 address. However, the new IPv4 address may be selected in any other manner. The new IPv4 address may be assigned to the attached device or the network port in response to detecting the conflict (duplicated addresses).

Some embodiments provide a method comprising monitoring network communications on a first port of the networking hardware device to identify a first network address of a first device attached to the first local port and determining that the first network address is incompatible with communication on an external network. The method further comprises automatically configuring, in response to determining that the first network address is incompatible with communication on an external network, independent network address translation for the first local port to translate the incompatible first network address to a compatible network address for all egress traffic from the first device and to translate the compatible network address to the incompatible first network address for all ingress traffic to the first device.

Some embodiments provide the technical benefit of improving the functioning of technology, such as improving the functioning of a networking hardware device or a computer system that includes a network hardware device. Specifically, some embodiments are able to automatically remediate a network address that is incompatible with communication on an external network so that a device attached to a downstream network port of the networking hardware device may communicate with other devices on the network. Other improvements to the functioning of the networking hardware device are described herein in reference to the various embodiments.

FIG. 1 is a diagram of a system 10 including a networking hardware device 20 with computing devices 40 attached to multiple local ports 22 and an uplink port 24 providing access to a client device 50 on an external network 12. Each of the local ports 22 (downstream ports), as well as the uplink port 24 are connected to switch fabric 26. The switch fabric 26 is used to handle network communications between the various ports 22, 24.

The networking hardware device 20 further includes a central processing unit 30, memory 32, forwarding engine 36 and replication engine 38. The central processing unit 30 may load and execute one or more applications or modules stored in the memory 32, such as snooping logic 33 (monitoring logic) and network address translation (NAT) logic 34. The central processing unit 30 may also store a network address translation (NAT) table 35 in the memory 32 and access the NAT table 35 to support the operations of the NAT logic 34. As described elsewhere herein, the monitoring or snooping logic 33 may be used by the central processing unit 30 to perform the operations of gathering information about the attached devices 40 and populating portions of the NAT table 35.

The forwarding engine 36 and replication engine 38 are intended to operate in their typical manner. For example, the forwarding engine 36 may maintain various lookup tables and make routing and switching decisions. The replication engine 38 may duplicate and dispatch frames to multiple ports as required. The networking hardware device 20 may have other known architectures without departing from the disclosed embodiments.

The NAT logic 34 preferably provides independent NAT operations or processes for each switch port 22. Each NAT process may monitor or snoop traffic on an individual switch port 22 to effectively isolate the device 40 that is attached to that individual switch port 22. Accordingly, the individual device attached to the switch port is isolated from other devices 40 within the local domain and also from other devices 50 in the external network 12 connected to the uplink port 24.

Figure 2:
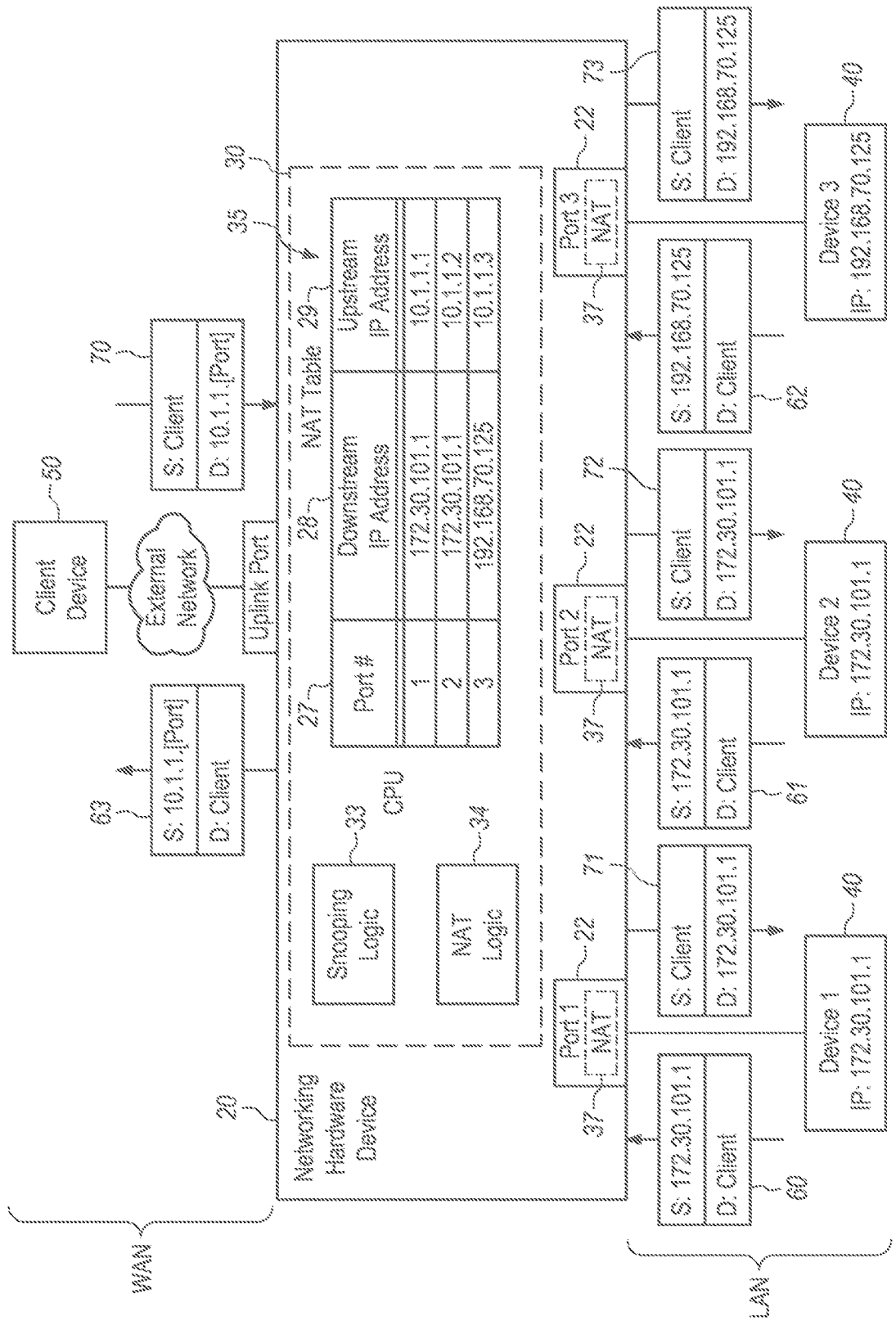
FIG. 2 is a diagram of the system of FIG. 1 illustrating the communication of network packets according to some embodiments.

FIG. 2 is a diagram of the system of FIG. 1 illustrating the communication of network packets according to some embodiments. Specifically, the diagram illustrates network packets that are being sent from each of the devices 40 attached to downstream ports 22 of the networking hardware device 20 to the client device 50 on the external network 12. According to embodiments described herein, the networking hardware device performs network address translation (NAT) separately on each port 22 within the networking hardware device 20 in order to resolve the conflicting (duplicate) IPv4 addresses of Device1 and Device2 and to resolve the unrouteable IPv4 address of the Device3. Network packets are illustrated with their source address and destination address as egress (outbound) network packets and ingress (inbound) network packets are translated by the NAT and forwarded. In FIG. 2, the direction of egress is illustrated in an upward direction and the direction of ingress is illustrated in a downward direction.

For each network port 22, network address translation (NAT) logic 34 may be activated and configured to be performed on the source IP address in network packets egressing (outbound) from the attached device (on the downstream-side of the network hardware device) to the client (on the WAN-side) and performed (in reverse) on the destination IP address in network packets ingressing (inbound) from the client 50 to the attached device 40. While the NAT for each attached device 40 may be performed by the central processing unit (illustrated by dashed lines 30) executing program instructions included in the NAT logic 34, the NAT is performed independently for each network port 22 as if the NAT were performed locally at each network port 22 (see dashed box 37 labeled "NAT" at each port 22).

In reference to FIG. 2, the CPU 30 uses the monitoring or snooping logic 33 to monitor traffic to and from the attached devices 40. After obtaining network packets from both Device1 and Device2, the NAT logic 34 may identify that both of these devices 40 have the same (duplicate) IPv4 address 172.30.101.1. The duplicate IPv4 addresses represents a conflict that makes the addresses incompatible with communication on the network. However, once the NAT logic 34 identifies the incompatible network address(es), the NAT logic 34 may configure the NAT table 35 with information or parameters that enable the attached devices 40 (Device1 and Device2) to communicate on the network. Specifically, the NAT logic 34 creates a record for one or both of the devices 40 that are the subject of the conflicting network addresses. Each record (illustrated as a row of the table) includes the network port identifier ("Port #") to which the device 40 is attached (see column 27), the Downstream IP Address of the device 40 (see column 28) and an Upstream IP Address (see column 29) that is to be used to represent the device 40 on the local network and the external network 12. The Upstream IP Address may be selected by the NAT logic from all IP addresses that are both routable and not in use by another device 40 on the subnet.

The duplicate IPv4 addresses represents a conflict that makes the addresses incompatible with communication on the network. However, once the NAT logic 34 identifies the incompatible network address(es), the NAT logic 34 may configure the NAT table 35 with information or parameters that enable the attached devices 40 (Device1 and Device2) to communicate on the network. Specifically, the NAT logic 34 creates a record for one or both of the devices 40 that are the subject of the conflicting network addresses. Each record (illustrated as a row of the table) includes the network port identifier ("Port #") to which the device 40 is attached (see column 27), the Downstream IP Address of the device 40 (see column 28) and an Upstream IP Address (see column 29) that is to be used to represent the device 40 on the local network and the external network 12. The Upstream IP Address may be selected by the NAT logic from all IP addresses that both routable and not in use by another device 40 on the subnet.

As a second example illustrated in FIG. 2, the snooping logic 33 may obtain a network packet from Device3 such that the NAT logic 34 may identify that the device 40 has an IPV4 address that is unrouteable on the external network. Specifically, Device3 is using the IPV4 address 192.168.70.125, which is within the range of 192.168.0.0/16 (i.e., range 192.168.0.0 to 192.168.255.255) that is reserved for private networks. Accordingly, the NAT logic 34 selects an upstream IP address to represent Device3 on the external network and creates another record (a third row) in the NAT Table 35 for storage of the port identifier, downstream IP address and upstream IP address that are associated with Device3.

Network packets (see network packets 60, 61, 62) generated by a device 40 (Device1, Device2, Device3) attached to a network port 22 of the networking hardware device 20 will form and send a network packet having its IPv4 address as the source (following the "S:") of the network packets. The NAT logic 34 detects that the network packet has been received from the device 40 at the network port 22 and translates the source address ("S:") from the device-facing downstream IPv4 address (see column 28) to the network-facing upstream IPv4 address (see column 29) associated with the network port 22 according to the NAT table 35. The network packet with the upstream IP address identified as the source (see network packet 63) is then routed in an ordinary manner to the destination (following the "D:"), which is shown as the "Client" IP address for the "Client Device" 50 in this illustration. The same NAT may be performed whether the egress network packet is being sent to another device 40 on same subnet as the device or to yet another device 50 on the external network 12. The Client Device 50 receiving the network packet 63 will note the network-facing upstream address identified in the network packet 63 as the source of the network packet.

If the Client Device (destination) 50 wants to sends a message back to the source device 40, the Client Device 50 will form and send a network packet 70 having its own IP address designated as the source (following the "S:") and having the network-facing upstream IP address of the device 40 designated as the destination (following the "D:"). When the network packet 70 reaches the networking hardware device 20, the NAT logic 34 will identify that the network packet 70 designates a destination address ("D:") 10.1.1.[port] that has an entry or record in the NAT table 35. Accordingly, the NAT logic 34 will translate the destination address within the network packet 70 from the network-facing upstream IP address (see column 29) to the device-facing downstream IP address (see column 28) in the record that includes the particular destination address 10.1.1.[port]. The translated network packet 71, 72, 73 is then forwarded to the network port 22 identified in the same record (row) of the NAT table 35. Since the destination address of the network packet 71, 72, 73 designates the device-facing downstream IP address of the device 40, the attached device 40 will recognize and received the network packet. Note that the network packets were successfully routed from and to the attached devices having incompatible network addresses without actually changing the network addresses of any of the devices 40. Still, the NAT logic 34 may generate a notification informing a network administrator of the devices having incompatible network addresses so that, at some future point in time, the administrator may manually change the network address(es) of one or more device to avoid the incompatibility and prevent the continuing need for the NAT logic 34 to translate network addresses for the devices according to the embodiments described herein.

Figure 3:
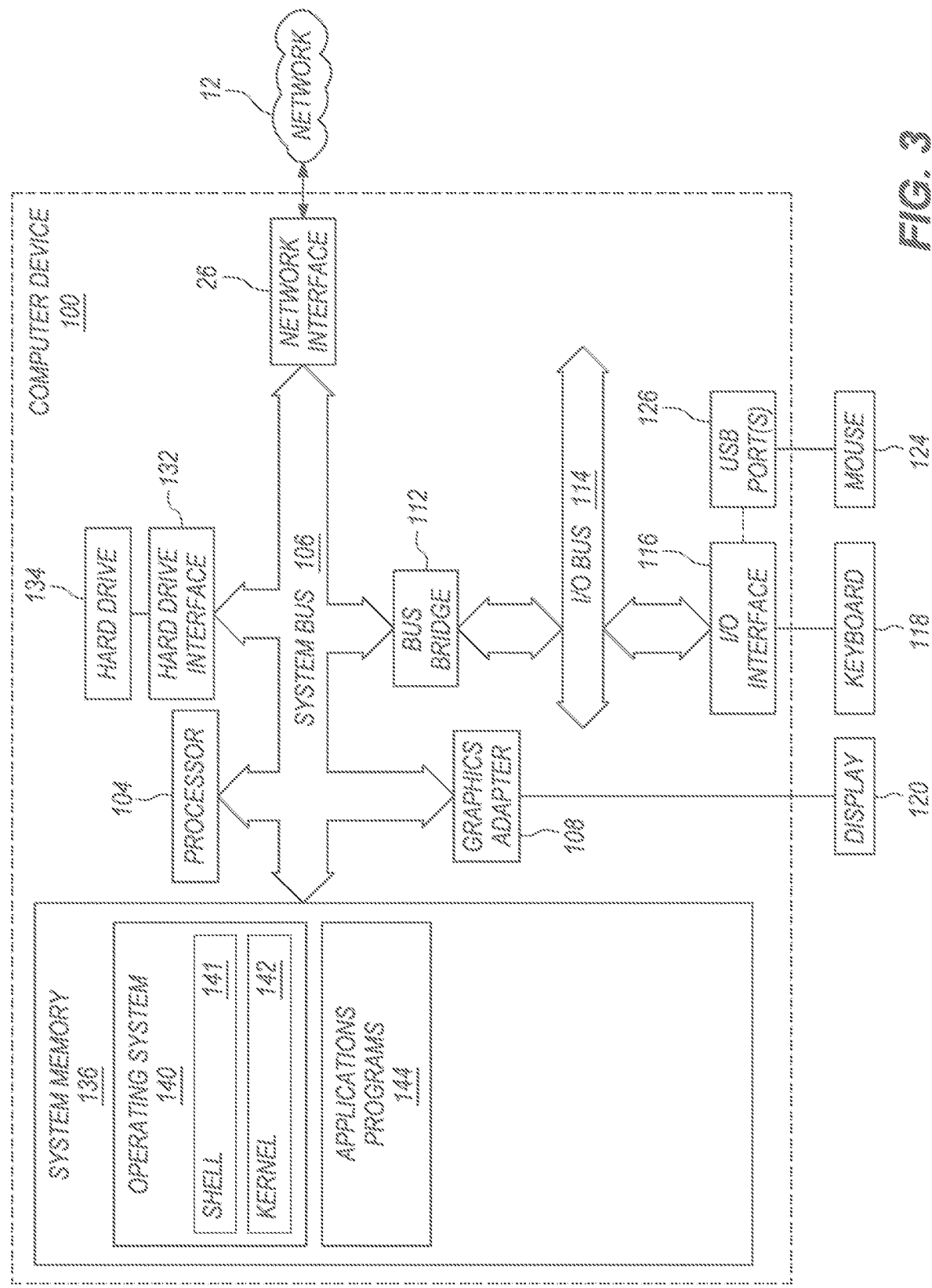
FIG. 3 is a diagram of a computing device according to some embodiments.

FIG. 3 is a diagram of a computing device 100 that may be representative of any of the local devices 40 (Device1, Device2, Device3) attached the downstream network ports 22 of the networking hardware device 20, and/or any client device 50 accessible via the uplink port 24 to the external network 12 as shown in FIGS. 1 and 2.

The computing device 100 includes a processor unit 104 that is coupled to a system bus 106. The processor unit 104 may utilize one or more processors, each of which has one or more processor cores. An optional graphics adapter 108, which may drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a keyboard 118 (perhaps a touch screen virtual keyboard) and a USB mouse 124 via USB port(s) 126 (or other type of pointing device, such as a trackpad). As depicted, the computing device 100 is able to communicate with other network devices over a network using a network adapter or network interface controller 130.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the computing device 100 are not intended to be exhaustive, but rather are representative.

The operating system 114 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computing device 100 may include application programs 144 stored in the system memory 136.

Figure 4:
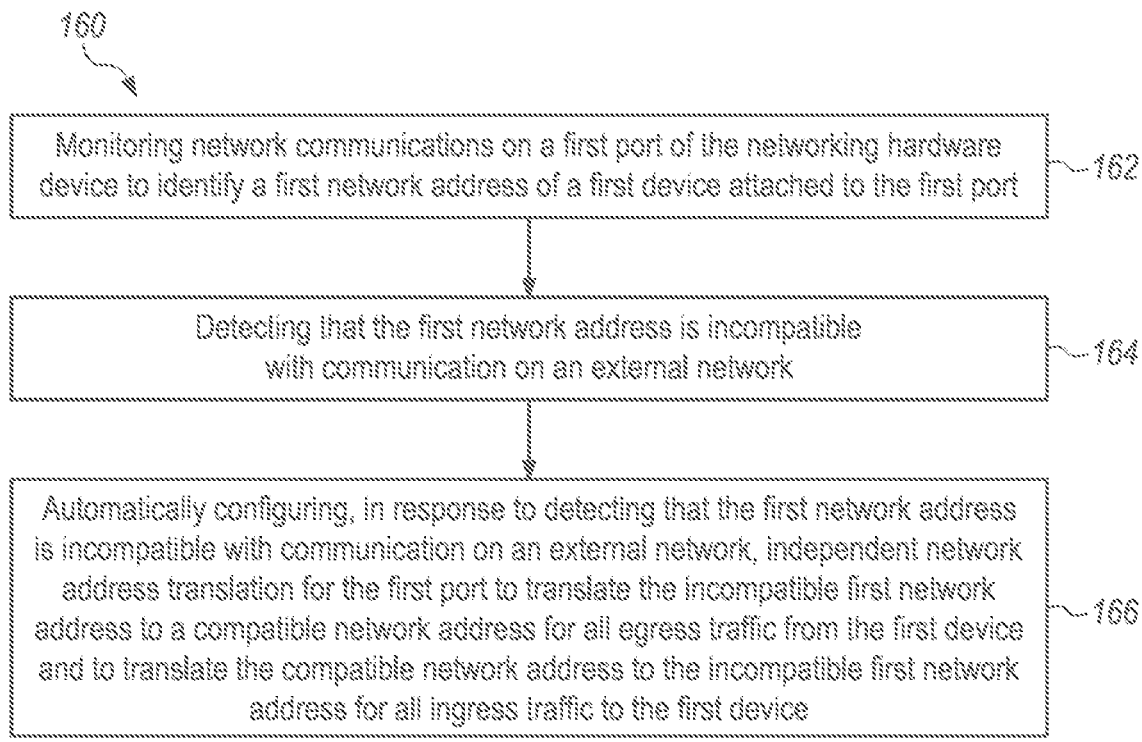
FIG. 4 is a flowchart of operations according to some embodiments.

FIG. 4 is a flowchart of operations 160 according to some embodiments. Operation 162 includes monitoring network communications on a first port of the networking hardware device to identify a first network address of a first device attached to the first port. Operation 164 includes determining that the first network address is incompatible with communication on an external network. Operation 166 includes automatically configuring, in response to determining that the first network address is incompatible with communication on an external network, independent network address translation for the first port to translate the incompatible first network address to a compatible network address for all egress traffic from the first device and to translate the compatible network address to the incompatible first network address for all ingress traffic to the first device.

Figure 5:
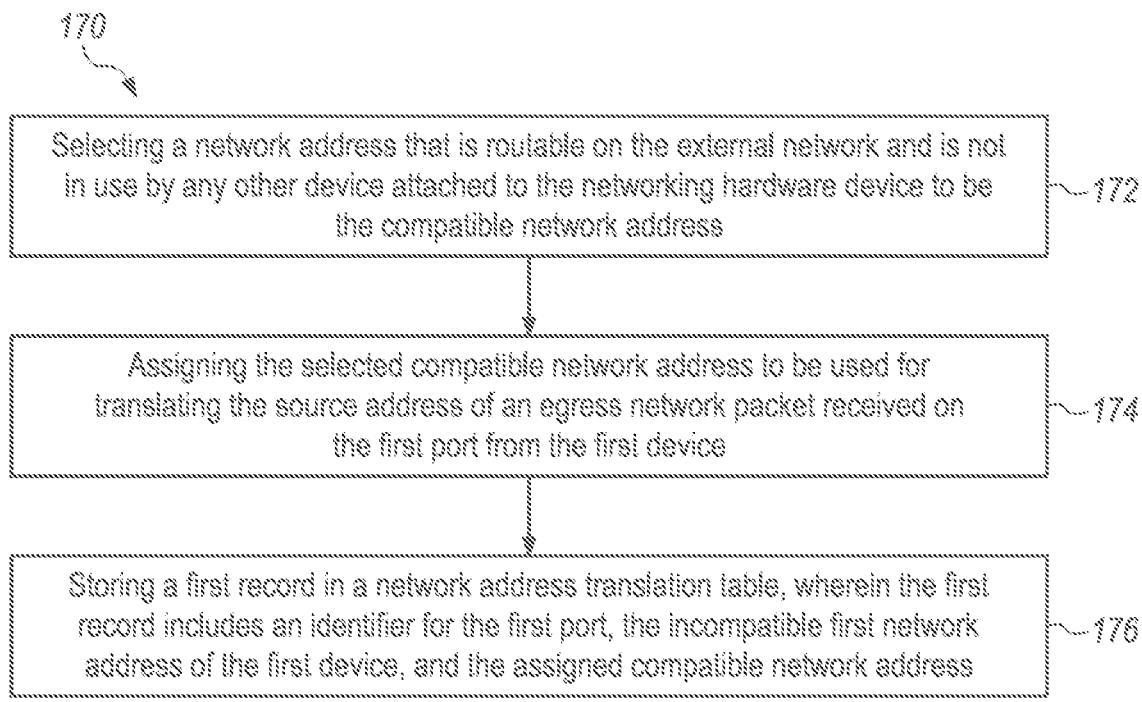
FIG. 5 is a flowchart of operations for creating a new record in a network address translation table according to some embodiments.

FIG. 5 is a flowchart of operations 170 for creating a new record in a network address translation table according to some embodiments. Operation 172 includes selecting a network address that is routable on the external network and is not in use by any other device attached to the networking hardware device to be the compatible network address. Operation 174 includes assigning the selected compatible network address to be used for translating the source address of an egress network packet received on the first port from the first device. Operation 176 includes storing a first record in a network address translation table, wherein the first record includes an identifier for the first port, the incompatible first network address of the first device, and the assigned compatible network address.

Figure 6:
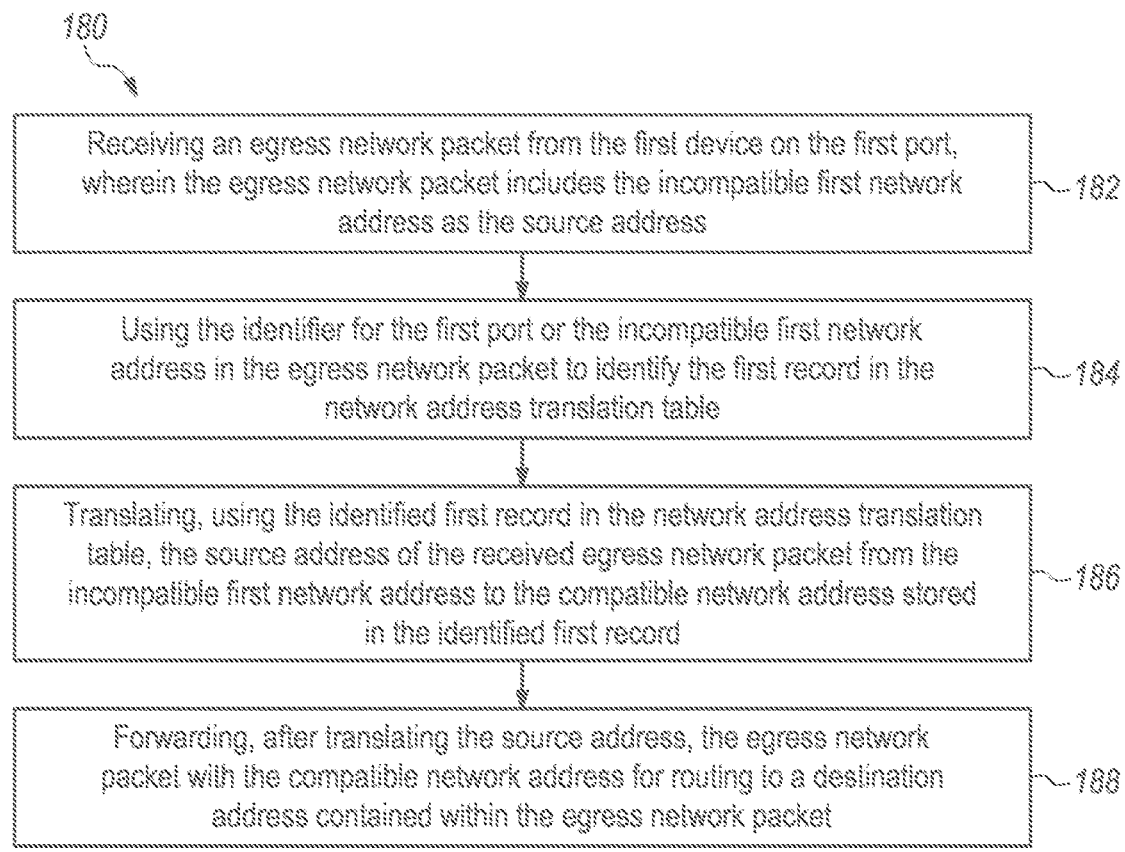
FIG. 6 is a flowchart of operations for translating and forwarding an egress network packet according to some embodiments.

FIG. 6 is a flowchart of operations 180 for translating and forwarding an egress network packet according to some embodiments. Operation 182 includes receiving an egress network packet from the first device on the first port, wherein the egress network packet includes the incompatible first network address as the source address. Operation 184 includes using the identifier for the first port or the incompatible first network address in the egress network packet to identify the first record in the network address translation table. Operation 186 includes translating, using the identified first record in the network address translation table, the source address of the received egress network packet from the incompatible first network address to the compatible network address stored in the identified first record. Operation 188 includes forwarding, after translating the source address, the egress network packet with the compatible network address for routing to a destination address contained within the egress network packet.

Figure 7:
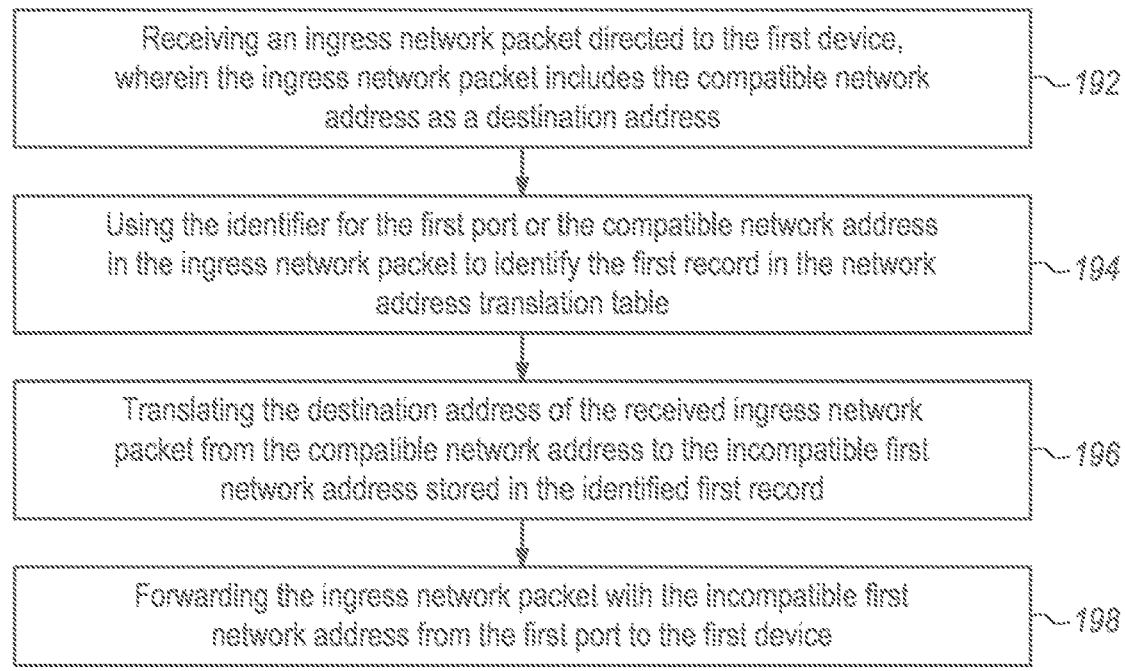
FIG. 7 is a flowchart of operations for translating and forwarding an ingress network packet according to some embodiments.

FIG. 7 is a flowchart of operations 190 for translating and forwarding an ingress network packet according to some embodiments. Operation 192 includes receiving an ingress network packet directed to the first device, wherein the ingress network packet includes the compatible network address as a destination address. Operation 194 includes using the identifier for the first port or the compatible network address in the ingress network packet to identify the first record in the network address translation table. Operation 196 includes translating the destination address of the received ingress network packet from the compatible network address to the incompatible first network address stored in the identified first record. Operation 198 includes forwarding the ingress network packet with the incompatible first network address from the first port to the first device.

The computer program products may further include program instructions for implementing or initiating any one or more aspects or operations of the methods described herein. Conversely, the methods may further include aspects or operations of the program instructions included in the computer program products described herein.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor of a networking hardware device to cause the processor to perform operations comprising:
    monitoring network communications on a first physical port of the networking hardware device to identify a first network address of a first device attached to the first physical port;
    determining that the first network address is incompatible with communication on an external network; and
    automatically configuring, in response to determining that the first network address is incompatible with communication on an external network, independent network address translation for the first physical port to translate the incompatible first network address to a compatible network address for all egress traffic from the first device and to translate the compatible network address to the incompatible first network address for all ingress traffic to the first device, wherein the operation of automatically configuring independent network address translation for the first port includes:
        selecting a network address that is routable on the external network and is not in use by any other device attached to the networking hardware device to be the compatible network address;
        assigning the selected compatible network address to be used for translating the source address of an egress network packet received on the first physical port from the first device; and
        storing a first record in a network address translation table, wherein the first record includes an identifier for the first physical port, the incompatible first network address of the first device, and the assigned compatible network address.

2. The computer program product of claim 1, the operations further comprising:
    receiving an egress network packet from the first device, wherein the egress network packet includes the incompatible first network address as a source address;
    translating the source address of the received egress network packet from the incompatible first network address to the compatible network address; and
    forwarding the egress network packet with the compatible network address for routing to a destination address contained within the egress network packet.

3. The computer program product of claim 2, wherein the incompatible first network address is only used to identify the first device in network communications on the link between the first device and the first physical port, and wherein the compatible network address is used to identify the first device in network communications between the first physical port and another device having the destination address.

4. The computer program product of claim 1, the operations further comprising:
    receiving an ingress network packet directed to the first device, wherein the ingress network packet includes the compatible network address as a destination address;
    translating the destination address of the received ingress network packet from the compatible network address to the incompatible first network address; and forwarding the ingress network packet with the incompatible first network address from the first physical port to the first device.

5. The computer program product of claim 1, the operations further comprising:
receiving an egress network packet from the first device on the first physical port, wherein the egress network packet includes the incompatible first network address as the source address;
using the identifier for the first physical port or the incompatible first network address in the egress network packet to identify the first record in the network address translation table;
translating, using the identified first record in the network address translation table, the source address of the received egress network packet from the incompatible first network address to the compatible network address stored in the identified first record; and
forwarding, after translating the source address, the egress network packet with the compatible network address for routing to a destination address contained within the egress network packet.

6. The computer program product of claim 5, the operations further comprising:
receiving an ingress network packet directed to the first device, wherein the ingress network packet includes the compatible network address as a destination address;
using the identifier for the first physical port or the compatible network address in the ingress network packet to identify the first record in the network address translation table;
translating the destination address of the received ingress network packet from the compatible network address to the incompatible first network address stored in the identified first record; and
forwarding the ingress network packet with the incompatible first network address from the first physical port to the first device.

7. The computer program product of claim 1, wherein the incompatible first network address is an unroutable network address.

8. The computer program product of claim 1, the operations further comprising:
monitoring network communications on a second physical port of the networking hardware device to identify a second network address of a second device attached to the second physical port, wherein the first network address is incompatible with communication on the external network due to the second network address being a duplicate of the first network address.

9. The computer program product of claim 8, wherein there is no independent network address translation configured for the second physical port.

10. The computer program product of claim 8, the operations further comprising:
automatically configuring, in response to determining that the second network address is a duplicate of the first network address, independent network address translation for the second physical port to translate the second network address to a second compatible network address for all egress traffic from the second device and to translate the second compatible network address to the second network address for all ingress traffic to the second device.

11. The computer program product of claim 8, wherein the first network address and the second network address are default IPv4 addresses.

12. The compute program product of claim 8, wherein monitoring network communications on the first physical port of the networking hardware device and the second physical port of the networking hardware device includes monitoring network communications on each physical port of the networking hardware device.

13. The computer program product of claim 1, the operations further comprising:
generating a notification identifying that the first device attached to the first physical port has an incompatible first network address.

14. The compute program product of claim 1, wherein the processor is a central processing unit for the networking hardware device, and wherein the network address translation for the first physical port is performed by the central processing unit.

15. The compute program product of claim 1, wherein the network address translation for the first physical port is performed at the first physical port.

16. The computer program product of claim 1, wherein the networking hardware device is a switch, router or gateway.

17. The computer program product of claim 1, the operations further comprising:
configuring the first and second physical ports to run in mirror mode to enable monitoring of local traffic between devices attached to local network physical ports of the networking device.

18. The computer program product of claim 1, the operations further comprising:
determining that a second device attached to a second physical port of the networking hardware device is being replaced with a third device attached to the second physical port, wherein the second device has a second network address, and the third device has a third network address; and
configuring, in response to detecting the replacement of the second device with the third device on the second physical port, independent network address translation for the second physical port to translate the third network address to the second network address for all egress traffic from the third device and to translate the second network address to the third network address for all ingress traffic to the third device.

19. The computer program product of claim 1, further comprising:
including the identifier of the first physical port in the compatible network address.

20. A method, comprising:
monitoring network communications on a first physical port of the networking hardware device to identify a first network address of a first device attached to the first physical port; determining that the first network address is incompatible with communication on an external network; and
automatically configuring, in response to determining that the first network address is incompatible with communication on an external network, independent network address translation for the first physical port to translate the incompatible first network address to a compatible network address for all egress traffic from the first device and to translate the compatible network address to the incompatible first network address for all ingress traffic to the first device, wherein the operation of automatically configuring independent network address translation for the first port includes:

selecting a network address that is routable on the external network and is not in use by any other device attached to the networking hardware device to be the compatible network address;

assigning the selected compatible network address to be used for translating the source address of an egress network packet received on the first physical port from the first device; and storing a first record in a network address translation table, wherein the first record includes an identifier for the first physical port, the incompatible first network address of the first device, and the assigned compatible network address.

21. A computer program product comprising a non-volatile computer readable medium and non-transitory program instructions embodied therein, the program instructions being configured to be executable by a processor of a networking hardware device to cause the processor to perform operations comprising:

monitoring network communications on a plurality of physical ports of the networking hardware device;

identifying, for each of the physical ports, a network address of a device attached to the physical port;

identifying one or more of the physical ports where the network address of the attached device is incompatible with communication on an external network; and automatically configuring, for each of the identified one or more physical ports where the network address of the attached device is incompatible with communication on the external network, independent network address translation for the physical port to translate the incompatible network address to a compatible network address for all egress traffic from the attached device and to translate the compatible network address to the incompatible first network address for all ingress traffic to the attached device, wherein the operation of automatically configuring independent network address translation for the each physical port includes:

selecting a network address that is routable on the external network and is not in use by any other device attached to the networking hardware device to be the compatible network address;

assigning the selected compatible network address to be used for translating the source address of an egress network packet received on the physical port from the attached device; and storing a record in a network address translation table, wherein the record includes an identifier for the physical port, the incompatible network address of the attached device, and the compatible network address assigned to the attached device.

* * * * *